(12) United States Patent
Ehrmann et al.

(10) Patent No.: US 9,038,381 B2
(45) Date of Patent: May 26, 2015

(54) DEVICE FOR ACTUATING A FLAP

(71) Applicant: Bayerische Motoren Werke Aktiengesellschaft, Munich (DE)

(72) Inventors: Stefan Ehrmann, Fichtenau (DE); Oliver Grabherr, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 13 days.

(21) Appl. No.: 13/721,956

(22) Filed: Dec. 20, 2012

(65) Prior Publication Data
US 2013/0118161 A1  May 16, 2013

Related U.S. Application Data

(63) Continuation of application No. PCT/EP2011/003266, filed on Jul. 1, 2011.

(30) Foreign Application Priority Data
Jul. 19, 2010  (DE) .................... 10 2010 031 500

(51) Int. Cl.
*F02B 37/18* (2006.01)
*F04B 9/04* (2006.01)
(Continued)

(52) U.S. Cl.
CPC ............... *F02B 37/00* (2013.01); *F02B 37/186* (2013.01); *F02C 6/12* (2013.01); *F16K 1/221* (2013.01); *F16K 31/521* (2013.01); *Y02T 10/144* (2013.01)

(58) Field of Classification Search
CPC ...... F16K 31/521; F16K 31/5282; F16K 1/20

USPC .............................. 60/602; 251/280, 298, 299
See application file for complete search history.

(56) References Cited

U.S. PATENT DOCUMENTS 2,999,666 A     9/1961  Sjoegren
3,119,594 A *   1/1964  Heggem ........................ 251/228
(Continued)

FOREIGN PATENT DOCUMENTS

DE        100 27 668 A1    12/2001
DE    10 2008 021748 A1    12/2009
(Continued)

OTHER PUBLICATIONS

DE 2008021748 English Translation.*
(Continued)

*Primary Examiner* — Thomas Denion
*Assistant Examiner* — Jessica Kebea
(74) *Attorney, Agent, or Firm* — Crowell & Moring LLP

(57) ABSTRACT

A device for actuating a flap, in particular a wastegate flap in an exhaust gas turbocharger for an internal combustion engine, includes a control rod, which can be moved by an actuator substantially in an axial direction and is guided in a fist gate via a first pin at the side thereof facing away from the actuator. A carriage is articulated on the first pin and is guided in the first gate via a second pin on the side facing away from the first pin, wherein a pivot lever is articulated on the second pin and, on the side facing away from the second pin, the pivot lever is rotatably mounted in a machine housing, preferably a turbine housing, and the flap is arranged on the pivot lever on the side facing away from the second pin. By way of the articulated design, a non-linear adjustment of the flap is possible.

12 Claims, 3 Drawing Sheets

(51) Int. Cl.
*F02B 37/00* (2006.01)
*F02C 6/12* (2006.01)
*F16K 1/22* (2006.01)
*F16K 31/52* (2006.01)

(56) References Cited

U.S. PATENT DOCUMENTS

| | | | | |
|---|---|---|---|---|
| 4,377,070 | A | * | 3/1983 | Shadbourne .................... 60/602 |
| 4,469,078 | A | * | 9/1984 | Speer et al. ................... 123/564 |
| 4,893,474 | A | * | 1/1990 | Miller et al. .................... 60/602 |
| 5,000,212 | A | * | 3/1991 | Tervo ................................ 137/1 |
| 5,078,108 | A | * | 1/1992 | Ishikawa et al. ............. 123/342 |
| 5,168,707 | A | * | 12/1992 | Yoshioka et al. ............... 60/612 |
| 5,205,125 | A | * | 4/1993 | Potter ............................. 60/602 |
| 5,501,427 | A | | 3/1996 | Ando |
| 2002/0050138 | A1 | * | 5/2002 | Deacon .......................... 60/602 |
| 2006/0185464 | A1 | * | 8/2006 | Telep et al. ..................... 74/519 |
| 2007/0271917 | A1 | | 11/2007 | Vogt |
| 2010/0024414 | A1 | * | 2/2010 | Hittle et al. ..................... 60/602 |
| 2012/0001111 | A1 | * | 1/2012 | Takeda et al. ................. 251/231 |

FOREIGN PATENT DOCUMENTS

| | | | |
|---|---|---|---|
| EP | 0 684 414 A1 | | 11/1995 |
| EP | 1 387 063 A2 | | 2/2004 |
| EP | 2362123 A1 | * | 8/2011 |
| FR | 2642132 A1 | * | 7/1990 ................ F16K 1/52 |
| WO | WO 2005/073606 A1 | | 8/2005 |
| WO | WO 2005073606 A1 | * | 8/2005 ............ F16K 31/528 |

OTHER PUBLICATIONS

International Search Report dated Oct. 4, 2011 w/ English translation (six (6) pages).

* cited by examiner

DEVICE FOR ACTUATING A FLAP

CROSS REFERENCE TO RELATED APPLICATIONS

This application is a continuation of PCT International Application No. PCT/EP2011/003266, filed Jul. 1, 2011, which claims priority under 35 U.S.C. §119 from German Patent Application No. DE 10 2010 031 500.1, filed Jul. 19, 2010, the entire disclosures of which are herein expressly incorporated by reference.

BACKGROUND AND SUMMARY OF THE INVENTION

The invention relates to a device that is configured for actuating a flap and, in particular, to a device that is configured for actuating a wastegate flap in an exhaust gas turbocharger for an internal combustion engine, the device having a control rod, which can be displaced largely in an axial direction by an actuator and which is guided in a first slotted link by way of a first pin on a side of the control rod that faces away from the actuator.

The invention is based on exhaust gas turbochargers that are arranged in series and that implement a boost pressure control facility by use of a wastegate flap (bypass flap) that is actuated by negative pressure. In this case the force that is generated in a negative pressure box is transferred to the wastegate flap by way of a rod.

With respect to the technical environment reference is made, for example, to the German published patent application DE 100 27 668 A1, on which this invention is based. This German published patent application describes a device for controlling the delivery rate of the compressor of an exhaust gas turbocharger that is connected to an internal combustion engine.

The invention proposes to open and close a wastegate valve by way of a twin pressure box that includes a pressure chamber (overpressure actuator), which is connected to a pressure source, and that includes another pressure chamber (negative pressure actuator), which is connected to a suction pump. The invention has the advantage that the entire setting range of the wastegate valve or, more specifically the wastegate flap, can always be used independently of the operating state of the internal combustion engine. This feature has, in particular, the advantage that when the internal combustion engine is operating under partial load without the need for a boost pressure, the wastegate valve can be totally opened; and, in so doing, the throttling losses and the backpressure losses can be reduced.

This design, as defined in the preamble, makes it possible to achieve an almost linear pressure/stroke curve over the entire setting range.

Especially in the case of a wastegate actuator that is actuated via the application of negative pressure, both the force, which is generated in the negative pressure box, and also the rod stroke of the actuator, are extremely limited. The result of this feature is that the wastegate flap can execute, in practice, only a small opening angle; and, in so doing, the wastegate channel in turn can be released only to a limited extent from a flow engineering viewpoint. However, under some circumstances and requirements, which the exhaust gas system and the charging system must meet, it may be necessary to open the wastegate (also called the bypass), very wide and, as a result, beyond the maximum opening angle that is customary at the present time.

For example, it is possible to achieve a very fast start of the catalytic converter (that is, the catalytic converter has reached 50% of its conversion temperature, a prerequisite for meeting the future exhaust gas emission standards, such as EU6), if in the first seconds after starting the internal combustion engine the hot exhaust gas is routed through the wastegate and reaches directly the honeycomb core of the catalytic converter, where the exhaust gas accelerates specifically the so-called "light-off" of the catalytic converter without a significant loss of enthalpy, which is the case on the flow path through the turbine of the exhaust gas turbocharger.

As a rule, a permanent change in the lever ratios between the internal lever and the external lever of the wastegate flap in order to enlarge the possible opening range is useful only to a limited extent for this purpose, because in this case the amount of force that the actuator has to generate increases. It is exactly in this range that the negative pressure systems, as they are commonly used at the present time, are extremely limited. Since the maximum force of a negative pressure box is the product of the maximally possible negative pressure and the achievable diaphragm area in the actuator, the limits of the system become immediately apparent. The maximum negative pressure is physically limited at theoretically 1 bar relative (in practice approximately 800 to 900 mbar relative); and the maximum diaphragm area, or more specifically the maximum diameter of the diaphragm, is usually defined by the installation space that is present and is limited by this installation space. Since the diaphragm at its given diameter can be deformed only up to a certain degree, the result is that the stroke of the actuator is also limited.

Systems that are actuated via the application of an overpressure can generate higher forces due to the higher levels of relative pressure that can be achieved, but these systems are just as limited in terms of the stroke.

Although systems with an electric actuator can achieve higher forces while at the same time increasing the stroke length, the size of the actuator with an integrated transmission is usually considerably larger than the vacuum cells, or more specifically the pressure boxes, that are often used.

The object of the present invention is to provide a measure by which larger flap angles (or more specifically higher forces) can be achieved with the same stroke of the actuator.

This and other objects are achieved by a device that is configured for actuating a wastegate flap in an exhaust gas turbocharger for an internal combustion engine, the device having a control rod, which can be displaced largely in an axial direction by an actuator and which is guided in a first slotted link by way of a first pin on a side of the control rod that faces away from the actuator. A carriage is arranged in an articulated manner on the first pin and is guided in the first slotted link by way of a second pin on the side facing away from the first pin, wherein a pivot lever is arranged in an articulated manner on the second pin. The pivot lever is mounted in a rotatable manner in a machine housing, preferably a turbine housing, on the side facing away from the second pin. The flap is arranged on the pivot lever on the side facing away from the second pin.

The present invention provides a "slotted link-guided" control system that is configured for the wastegate flap. The invention is characterized, in particular, in that it enables a variable lever ratio at the wastegate lever, the pivot lever. When the wastegate lever is closing, the force engagement point of the control rod engages with the wastegate lever with a lever that becomes increasingly larger and, in so doing, enables a high closing force (or more specifically a high locking force) of the wastegate flap. In the other direction, in which the wastegate flap opens, the lever decreases with the result that a larger opening angle of the wastegate flap can be attained with the stroke of the control rod. When the lever ratios and the angle ratios of such a kinematic arrangement are appropriately configured, the force ratios and the stroke ratios can be designed to meet the requirements of the respective application in a way that is conducive to achieving the objective.

A plurality of kinematic arrangements are contemplated, depending on the boundary conditions and the specific requirements that the system must meet. The system, shown in FIG. 1, shows only one possible arrangement as an example. The slotted links (gates), in which the carriage runs, can be configured, as shown, as separate slotted links or as one continuously connected slotted link. In this context, the slotted links can be shaped in the form of a straight line or in the form of an arc in the various exemplary embodiments or can even be represented in arbitrary curves. In this respect the shaping of the slotted links is a control variable in order to influence the stroke/angle function, with which the actuator moves the wastegate flap.

Similarly, the stroke/angle function can be influenced by the distance between the first pin and the second pin at the carriage, which runs in the one slotted link or in the slotted links by use of these two pins. The force engagement points of the control rod at the carriage and the force engagement points of the carriage at the pivot lever can be selected totally independently of the position of the two pins. In FIG. 1, the two pins are congruent with the force engagement points and, hence, can be produced very easily, so that the number of components and the assembly costs are kept low.

Furthermore, it is also possible to dispense with the carriage in that the above-described force engagement points of the carriage and the force engagement points of the control rod at the pivot lever are combined and are guided in one common slotted link. Since, however, in this case the attachment point of the control rod in the slotted link guide itself has to perform an increased transverse motion relative to the axis of the rod, the result is a higher load on the diaphragm or, more specifically, the actuator. This higher load may reduce the service life of the diaphragm or, more specifically, the actuator. In order to prevent this higher load, the control rod is guided axially in an additional alternative, so that the control rod cannot deviate transversely to its main direction of motion. In this case the force engagement point of the control rod can be connected to a lever with the slotted link-guided force engagement point of the pivot lever in such a way that the control rod does not have to have its own slotted link guide.

Another embodiment can provide two or more carriages, so that a setting motion of the flap can be designed in a way that it is even more targeted.

Even the choice of the geometry of the slotted links, the position of the attachment points of the control rod, the position of the attachment points of the pivot lever, the distance between the guide points of the carriage(s), the other lever ratios and the geometric ratios and the respective angle adjustments at various operating points are based on the requirements of the system to be designed and can be selected as required.

According to an embodiment wherein the second pin is mounted in a third slotted link in the pivot lever, the variable lever ratio between the internal lever and the external lever of the wastegate flap can be achieved in an advantageous way.

An embodiment wherein at least one of the first and third slotted links has a curved shape is an especially preferred design variant, which allows a number of different kinematics.

An embodiment wherein at least one of the first and second pins is mounted on anti-friction bearings in the first and/or third slotted link reduces the friction in the device and reduces the wear.

An embodiment wherein the first slotted link is arranged stationarily in a link plate is an especially preferred design variant.

An embodiment wherein the first slotted link is divided into the first slotted link and a second slotted link is a design that has proven to be especially effective with respect to the kinematics and that at the same time exhibits a high mechanical strength.

In a preferred embodiment, the actuator can be actuated pneumatically, electromechanically or hydraulically. Further, the actuator may be an overpressure actuator or a negative pressure actuator.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
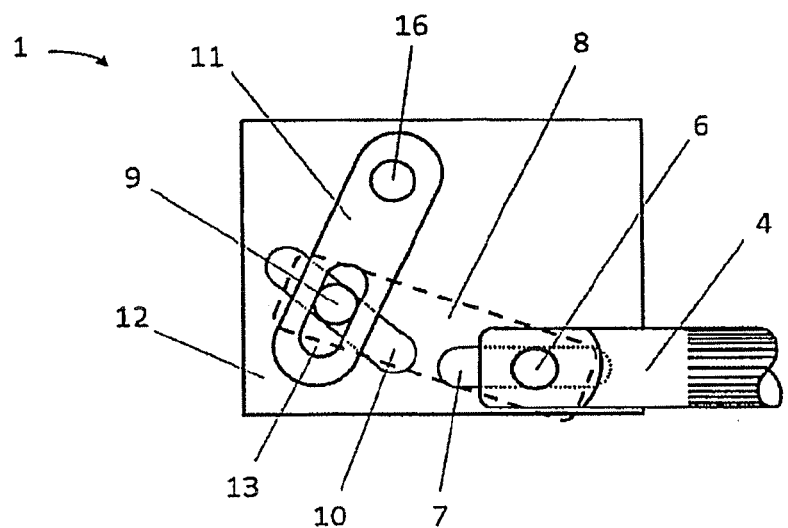
FIG. 1 is a top view of a first exemplary embodiment of an inventive device for actuating a flap.
Figure 2:
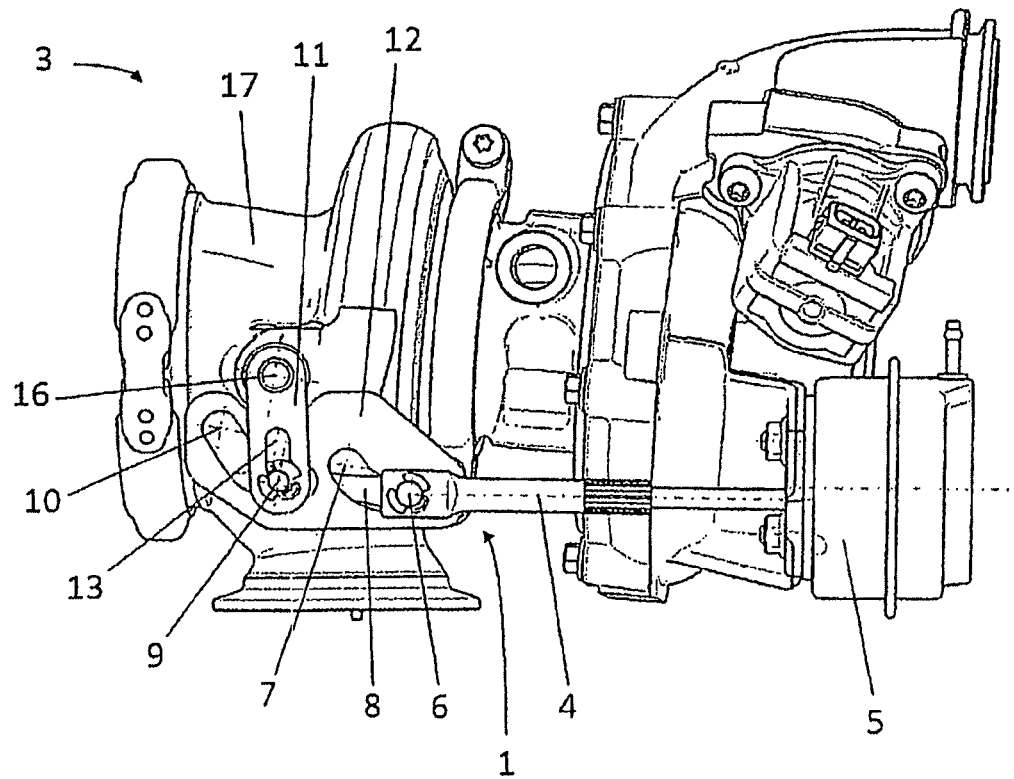
FIG. 2 is a top view of a three dimensional representation of the device for actuating a flap in a second exemplary embodiment.
Figure 3:
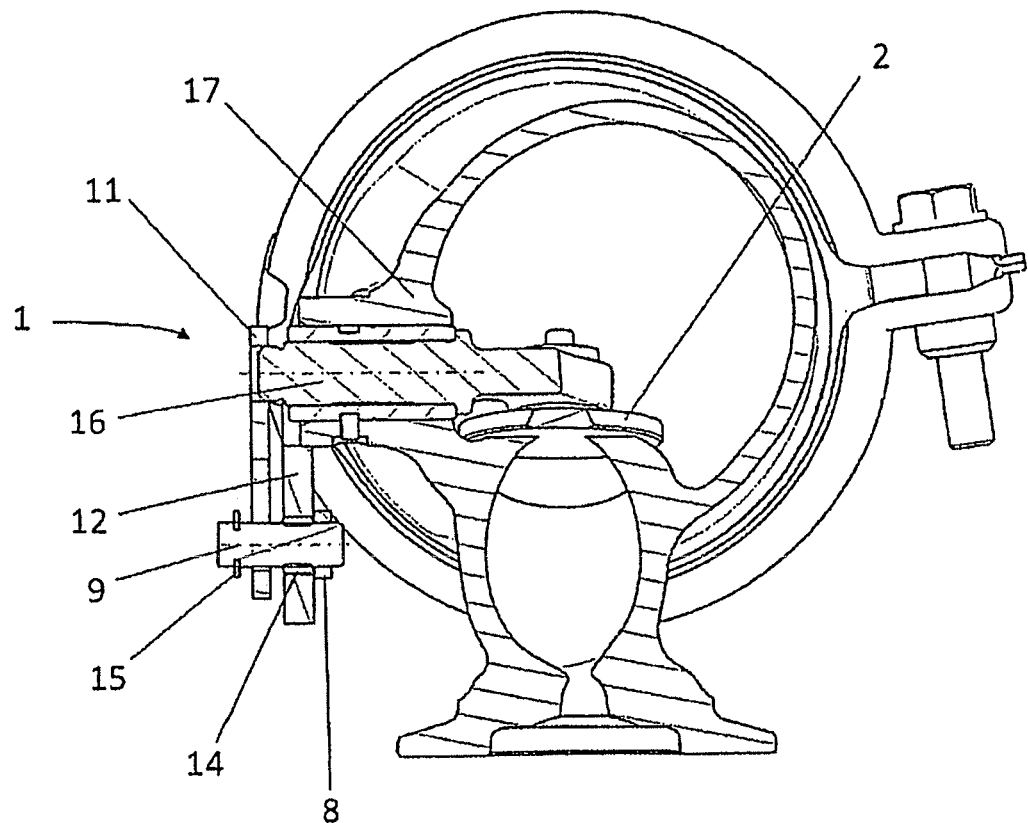
FIG. 3 is a cross-sectional view of an exemplary flap arm of an inventive device for actuating a flap.
Figure 5:
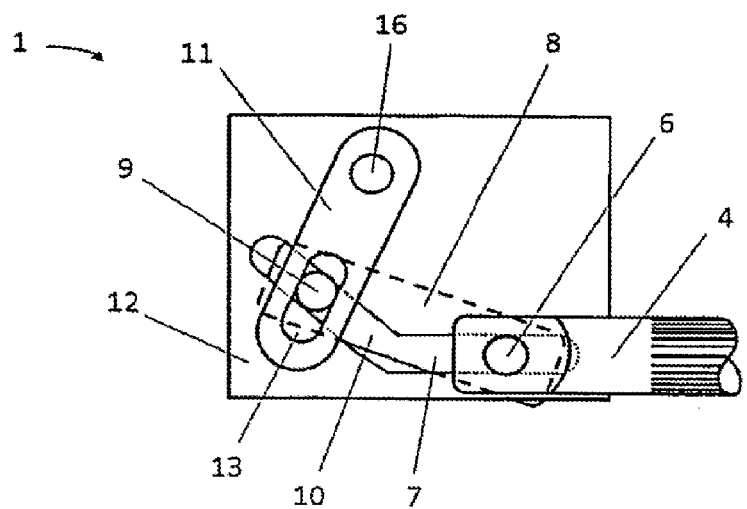
FIG. 5 is a top view of another exemplary embodiment of an inventive device for actuating a flap.

FIG. 1 is a top view of an exemplary inventive device 1 for actuating a flap 2 (see FIG. 3), in particular a wastegate flap in an exhaust gas turbocharger 3 for an internal combustion engine. The device 1 consists of a control rod 4, which can be displaced largely in its axial direction by an actuator 5, which is depicted in FIG. 2. This control rod 4 is guided in a first slotted link (gate) 7 by way of a first pin 6 on the side of the control rod 4 that faces away from the actuator 5. Furthermore, a carriage 8 is arranged in an articulated manner on the first pin 6; and this carriage 8 is guided in a second slotted link (gate) 10 by way of a second pin 9 on the side facing away from the first pin 6. The first and second slotted links can be formed by portions of a continuous first slotted link (as depicted in FIG. 5) or can be two separate slotted links (as depicted in FIG. 1). In this case, a pivot lever 11 is arranged in an articulated manner on the second pin 9. The pivot lever 11 is mounted in a rotatable manner in a machine housing, for example, a turbine housing 17 of an exhaust gas turbocharger 3, by way of a flap arm 16 on the side facing away from the second pin 9. In this case, the flap 2 is attached to the flap arm 16 as seen in FIG. 3.

Figure 6:
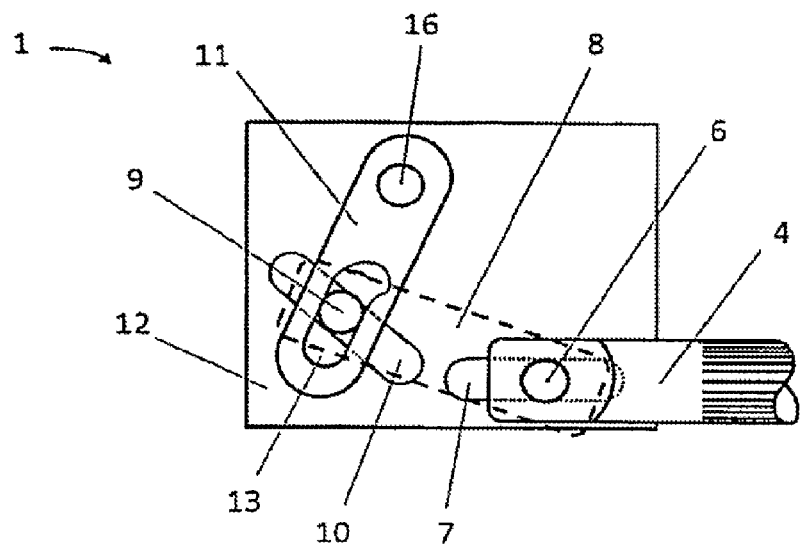
FIG. 6 is a top view of a further exemplary embodiment of an inventive device for actuating a flap.

In a first exemplary embodiment, the link plate 12 includes the first slotted link 7 and the second slotted link 10. In addition, the pivot lever 11 has a third slotted link (gate) 13 for the second pin 9. In this first exemplary embodiment the slotted links 7, 10, 13 are configured so as to be straight, but the first, the second and/or the third slotted link 7, 10, 13 may also exhibit any curved shape (as depicted in FIG. 2 and FIG. 6).

In an especially preferred exemplary embodiment, the first and/or the second pin 6, 9 is or are mounted on anti-friction bearings in the first, the second and/or the third slotted link 7, 10, 13, in order to reduce the friction and, thus, the wear and the setting forces.

Preferably, the first and the second slotted link 7, 10 are arranged in the link plate 12, which is in a preferred manner either a part of (or a securely connected attachment part of) the turbine housing 17 of the exhaust gas turbocharger 3.

It is especially preferred that the actuator 5, shown in FIG. 2, is actuated by pneumatic, electromechanical or hydraulic mechanisms. In the case of a pneumatic actuator 5, this actuator is preferably an overpressure actuator or a negative pressure actuator.

In yet another exemplary embodiment the carriage 8 can also be arranged between the control rod 4, the pivot lever 11 and the link plate 12.

FIG. 2 is a top view of an exemplary inventive device 1 for actuating a flap 2, which is arranged on an exhaust gas turbocharger 3. In principle, FIG. 2 includes generally the same kinematics as in FIG. 1, but in this second exemplary embodiment the link plate 12 has a curved first slotted link 7 and a curved second slotted link 10. Similarly the actuator 5 for driving the control rod 4 is also shown. As described above with respect to FIG. 1, the link plate 12 is securely attached to the turbine housing 17 of the exhaust gas turbocharger 3.

FIG. 3 is a cross sectional view of the turbine housing 17 and the flap arm 16 of the device 1 according to the invention. FIG. 3 shows very clearly the anti-friction bearing 14 for the second pin 9, which in turn is held with a locking device 15. Furthermore, FIG. 3 shows very clearly the three layer design of the device 1. The pivot lever 11 is situated on the outside facing away from the turbine housing 17; and the carriage 8 is situated on the inside facing the turbine housing 17. Between the carriage 8 and the pivot lever 11 there is the link plate 12, which is arranged stationarily relative to the turbine housing 17. As stated above, the carriage 8 can also be arranged between the control rod 4, the pivot lever 11 and the link plate 12.

Figure 4:
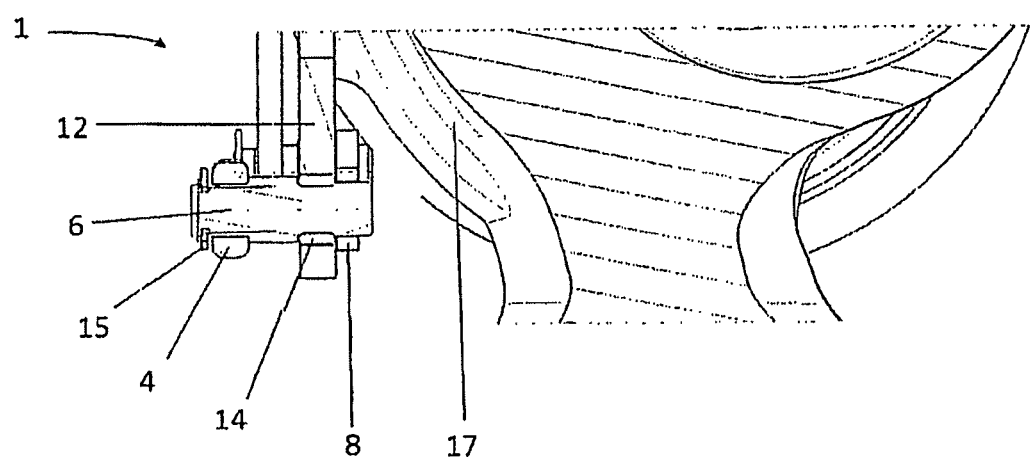
FIG. 4 is a cross-sectional view of an exemplary first pin of an inventive device for actuating a flap.

FIG. 4 is a cross-sectional view of the first pin 6 and a part of the turbine housing 17. The first pin 6 also has a locking device 15 and, in turn, an anti-friction bearing 14. The link plate 12 is arranged stationarily on the turbine housing 17.

In comparison to a conventional rod actuator, the invention allows the opening angle of the flap 2 to be significantly increased with the use of the same actuator 5. The main points of the configuration relating to force and stroke can be defined and set with a wide spectrum as a function of the boundary conditions and the specific requirements of the system.

For example, the goal should be to achieve optimal kinematic conditions for a high amount of transferred force when the wastegate flap 2 is in the closed point (high closing force or more specifically high locking force), whereas in the other direction a large opening angle is contemplated when the requirements for the actuating force are significantly less.

Briefly summarized, the invention offers, in particular, the following advantages:

(a) the maximum opening angle of the wastegate flap can be increased owing to the slotted link-guided control system;

(b) despite the large opening angle high closing forces can be achieved;

(c) functional characteristics of the angle over stroke (from regressive to progressive) can be easily influenced to a large extent;

(d) electrification of the actuator by means of an electric wastegate actuator is not necessary;

(e) accelerated light-off of the catalytic converter to fulfill future exhaust gas emission standards (for example, EU6) is possible;

(f) increased de-throttling of the turbine is possible;

(g) expansion of the possible applications with the implementation of the engine control system; and (h) component costs reduced, compared to an electric actuator.

Today's series configuration of turbochargers can be easily adapted to an inventive state with the slotted link-guided control system.

LIST OF REFERENCE NUMERALS 1. device
2. flap
3. exhaust gas turbocharger
4. control rod
5. actuator
6. first pin
7. first slotted link
8. carriage
9. second pin
10. second slotted link
11. pivot lever
12. link plate
13. third slotted link
14. anti-friction bearing
15. locking device
16. flap arm
17. turbine housing The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus configurable for actuating a flap via an actuator, the apparatus comprising:
   a control rod operatively configured to be displaceable via the actuator;
   a first slotted link having a first link portion and a second link portion in a link plate;
   a first pin arranged on a side of the control rod facing away from the actuator, the control rod being guided in the first slotted link via the first pin;
   a carriage separate from the link plate arranged in an articulated manner on the first pin and guided in the second link portion via a second pin on a side of the carriage facing away from the first pin; and
   a pivot lever arranged in an articulated manner on the second pin, the pivot lever being mountable in a rotatable manner in a machine housing on a side facing away from the second pin, wherein the flap is arrangeable on the pivot lever on the side facing away from the second pin,
   wherein the control rod is displaced generally axially in a direction between the actuator and the first link portion.

2. The apparatus according to claim 1, wherein the apparatus is configured for actuating a wastegate flap in an exhaust gas turbocharger for an internal combustion engine, and wherein the machine housing is a turbine housing of the gas turbocharger.

3. The apparatus according to claim 1, wherein the second pin is mounted in a pivot lever slotted link in the pivot lever.

4. The apparatus according to claim 3, wherein at least one of the first link portion and the pivot lever slotted link has a curved shape.

5. The apparatus according to claim 3, wherein at least one of the first and the second pin is mounted on anti-friction bearings in the respective at least one of the first and the pivot lever slotted link.

6. The apparatus according to claim 1, wherein the first slotted link is arranged stationarily in a link plate of the apparatus.

7. The apparatus according to claim 1, wherein the first slotted link comprises two separate gates, with a first of the two separate gates being said first link portion of the first slotted link and a second of the two separate gates being said second link portion of the first slotted link.

8. The apparatus according to claim 3, wherein the first slotted link comprises two separate gates, with a first of the two separate gates being said first link portion of the first slotted link and a second of the two separate gates being said second link portion of the first slotted link.

9. The apparatus according to claim 1, wherein the actuator is one of a pneumatic, electromechanical and hydraulic actuator.

10. The apparatus according to claim 2, wherein the actuator is one of a pneumatic, electromechanical and hydraulic actuator.

11. The apparatus according to claim 9, wherein the actuator is one of an pneumatic positive pressure actuator and a pneumatic negative pressure actuator.

12. The apparatus according to claim 10, wherein the actuator is one of an pneumatic positive pressure actuator and a pneumatic negative pressure actuator.

* * * * *